April 21, 1936.  H. P. HASTINGS  2,037,900
EXPLOSIONPROOF PANEL BOARD
Filed May 22, 1933  3 Sheets-Sheet 2
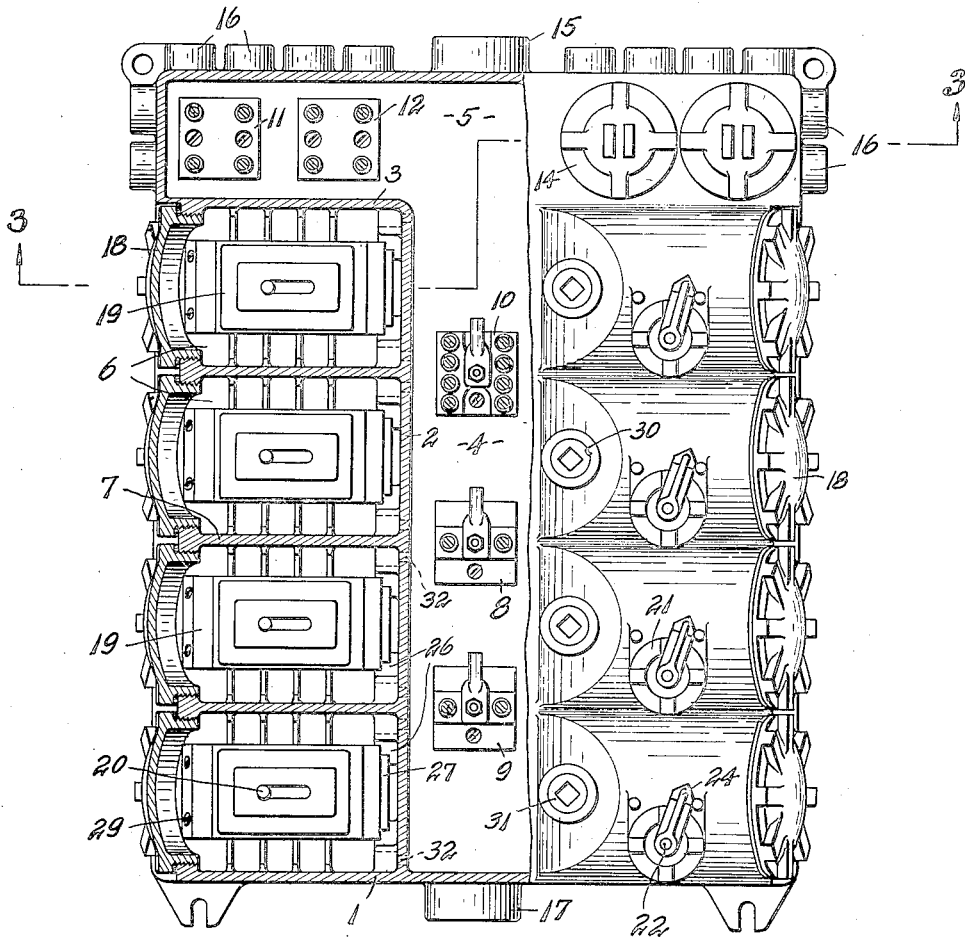
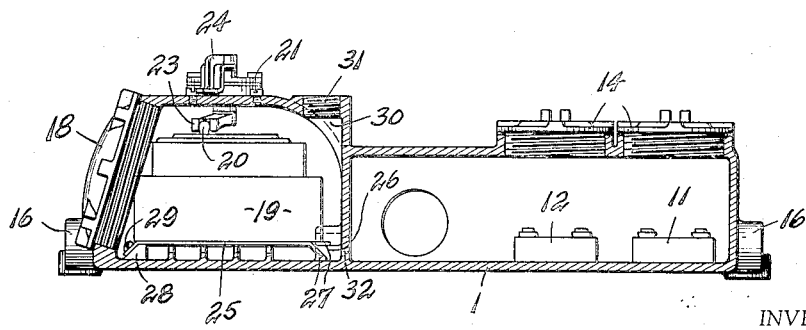
INVENTOR:
Harold P. Hastings,
BY
Bodell & Thompson
ATTORNEYS.

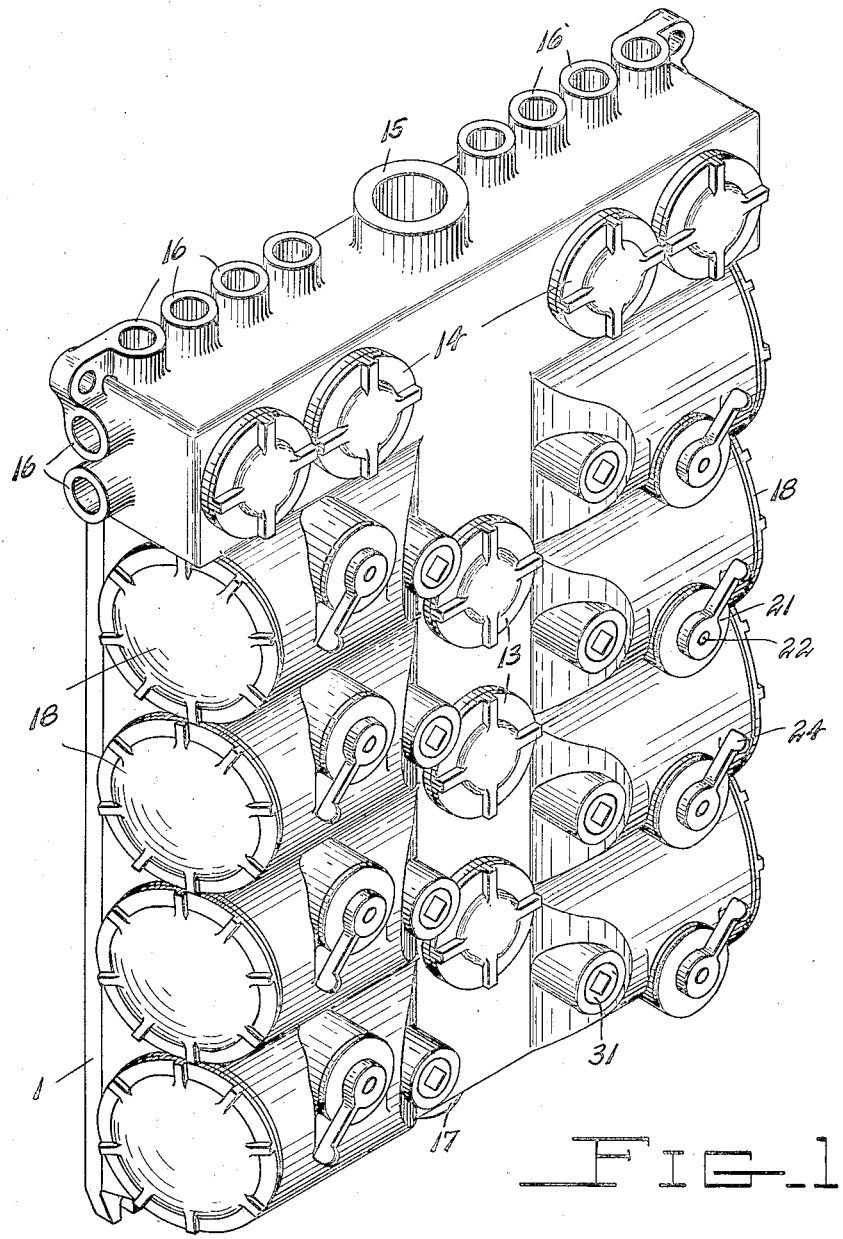

April 21, 1936.  H. P. HASTINGS  2,037,900
EXPLOSIONPROOF PANEL BOARD
Filed May 22, 1933   3 Sheets-Sheet 3
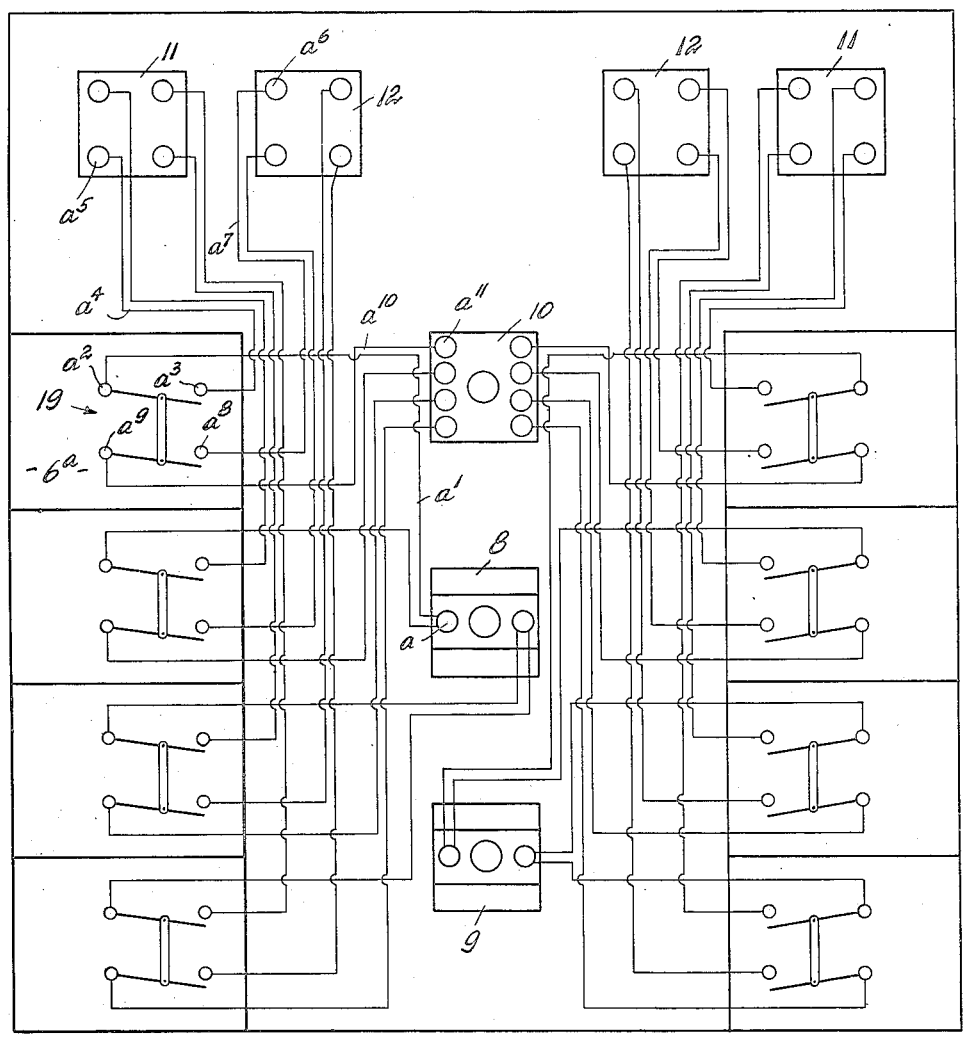
INVENTOR:
Harold P. Hastings,
BY Bodell & Thompson
ATTORNEYS.

Patented Apr. 21, 1936

2,037,900

UNITED STATES PATENT OFFICE 2,037,900

EXPLOSIONPROOF PANEL BOARD

Harold P. Hastings, Syracuse, N. Y., assignor to Crouse-Hinds Company, Syracuse, N. Y., a corporation of New York Application May 22, 1933, Serial No. 672,152

11 Claims. (Cl. 247—18)

This invention relates to enclosed explosion resisting panel boards and has for its object an explosion proof or resisting panel board or a closed panel board or box having a plurality of circuit breaker or switch compartments in which each circuit breaker or switch is located in its own individual compartment separated from other switch compartments and from wire passages by partitions and further in which the wiring connections are made to service wires and load circuit wire terminals through work holes in the box or the top thereof, which are closed by vapor tight closures, and further in which each switch compartment is accessible through a vapor tight closure at the outer end of each compartment. It further has for its object an explosion resisting panel board in which individual switch compartments and wire passages are compactly arranged so as to take up a minimum area and more particularly, an explosion proof or entirely closed panel board or box wherein the wire passages are in the general form of a T and the switch or circuit breaker compartments extend laterally from opposite sides of the leg of the T, all whereby the compartments and passages are grouped together in an extremely compact arrangement.

Other objects appear throughout the specification.

The invention consists in the novel features and in the combinations and constructions hereinafter set forth and claimed.

In describing this invention, reference is had to the accompanying drawings, in which like characters designate corresponding parts in all the views.

Figure 1 is an isometric view of this explosion proof panel board.

Figure 2 is a plan view, partly broken away.

Figure 3 is a sectional view taken approximately on line 3—3, Figure 2.

Figure 4 is a circuit diagram of the panel connections.

This closed or explosion proof panel board comprises a box closed at its sides, bottom and top and formed with internal partitions dividing it into wire passages and individual circuit breaker or switch compartments, terminal blocks for the service wires and the load circuits in said passages, wire openings in a wall or walls of the box opening into said passages, work holes in the top of the box over the terminal blocks, removable vapor tight closures for the openings, each of the switch compartments also having openings or work holes through which they are accessible and through which the switches or circuit breakers can be installed and removed and removable vapor tight closures for the same, also suitable openings connecting each switch compartment with the wire passages, which openings are sealed after the wires are installed, and also switch operating mechanism on the outside of the compartments and connected to the movable operating members of the switches, the mechanism being carried by vapor tight closures for openings in the walls of the compartments. Preferably, the box is formed with its side, bottom and top walls and its partitions integral. In order that the box may be of maximum capacity for a given size, the wire passages are in the form of a T with the leg of the T extending centrally of the box and the head of the T at one end thereof, and the switch compartments are located on opposite sides of the leg of the T extending laterally therefrom. The box is provided with wire openings, which open into said passages, these wire openings being enclosed by nipples for connection to electric conduits.

1 designates the box which is provided with partitions 2 and 3 forming sides of wire passages 4 and 5, and with individual switch compartments 6 extending laterally from the passage 4 and separated therefrom by the partitions 2 and from each other by partitions 7 and from the load circuit passages by the partition 3.

8, 9 and 10 are terminal blocks for service wires of a three wire system. 11 and 12 are terminal blocks in the load circuit wire passage 5. 13 are closures, preferably plugs, threading into work holes over the terminal blocks 8, 9 and 10 and 14 are similar closures or plugs threading into work openings over the terminal blocks 11 and 12. 15 is a nipple enclosing a wire opening for the service wires which are enclosed in an electric conduit coupled to the nipple.

16 are nipples enclosing openings for the load circuit wires enclosed in conduits coupled to the nipples, these openings communicating with the passage 5. Preferably, there is an additional nipple 17 at the opposite end of the block to that on which the nipple 15 is located, but this nipple 17 may or may not be used, and when not used, it is closed. The outer end of each switch compartment is also provided with a closure in the form of a plug 18.

19 designates switches or circuit breakers, one of which is located in each switch compartment 6. These may be of any suitable construction and are provided with an operating member 20. The operating member is actuated from the outside of the compartments through operating mechanism carried by a plug 21 threading into an opening in the top wall of each compartment. The operating mechanism here shown includes a shaft 22 journalled in the plug 21 and having an arm 23 at its inner end coupled with the switch operating member 20 and a handle 24 at its outer end. Each switch 19 is mounted upon a base plate 25 and the base plate is secured in the switch compartment or in ribs 26, 28 thereof and as here shown, this plate is formed with bifurcations or shoulders 27 at its inner end which engage or pry against the correspondingly formed ribs 26 on the rear wall of each compartment and the plate is secured to the ribs 28 at the front end of the compartment by screws 29 accessible through the open outer end of each compartment when the closure 18 is removed.

In placing the switch 19 in the compartment, it is held with the base plate 25 at an inclined angle until the shoulders 27 straddle the ribs 26 and then the plate is pressed down into horizontal position against the ribs 28 on the front end of the compartment. The screws 29 are then placed in position. However, each switch compartment may be provided with a work hole 30 at its rear end for manipulating a screw, not shown, for securing the rear end of the base plate in the socket. This work hole 30 is closed by a vapor tight plug 31. The partitions 2 are formed with wire openings at 32 connecting each switch compartment with the wire passage 4 and these openings are sealed through the open end of the compartments 6 when the plugs 18 are removed, after the wires have been led through them. The top wall of the box, as seen in Figure 1, is formed with the top walls of the switch compartments semi-cylindrical and projecting above the top wall of the passages 4, 5.

The panel board here shown is for a three wire system and the feed wires are connected to the terminals on the blocks 8, 9 and the neutral or return wire to the terminals on the block 10. These wires are led into the box either through the nipples 15 or 17 and may terminate in the box or pass out through the other nipple to another box or electrical appliance.

The switches 19 in the various compartments 6 control different load circuits. These are, as here shown, double pole switches of any well known construction and two of the terminals are connected to a terminal on the blocks 8 or 9 and to a terminal on the block 10.

A tracing of the circuit for one of these circuits will be sufficient for all of them. For example, the circuit controlled by the switch 19 in the compartment $6^a$ (Figure 4) is as follows: From terminal $a$ on terminal block 8 through wire $a^1$ to switch terminal $a^2$ thence through switch arm of switch terminal $a^3$ through wire $a^4$ to terminal $a^5$ on one of the load circuit terminal blocks, as on the block 11, thence through the branch of the load circuit which passes out through one of the nipples 16 through the other branch of the load circuit to terminal $a^6$ on another terminal block as the terminal block 12, thence through wire $a^7$ to switch terminal $a^8$ through the switch arm to the switch terminal $a^9$ thence through wire $a^{10}$ to a terminal $a^{11}$ on the return terminal block 10. The switches in the compartments are similarly connected to terminals on either the blocks 8 or 9 and to terminals on the blocks 11, 12.

A panel board so constructed is particularly compact and vapor tight and the various switch compartments, where arcing occurs, are vapor tight and sealed from each other and from other passages, and even if vapor should penetrate within the box, any explosions are locally confined. The box is particularly adapted to be used in places where explosive gases and vapors are present in the surrounding atmosphere.

What I claim is:

1. A closed panel board comprising a box having integral side, bottom and top walls and with integral partitions forming individual switch compartments and service wire and load circuit wire passages, said passages being in the general form of a T with the leg of the T forming the service wire passage and the head of the T forming a load circuit wire passage, the switch compartments extending on opposite sides of the leg of the T and having removable closures at their ends opposite the leg of the T and being separated by the partitions and from each other and from said passages, the box being also formed with openings for the service wire and the load circuit wires opening into said passage, terminal blocks in said passages, a work hole in the top of the box over each of said blocks and removable closures for the work holes.

2. An enclosed explosion resisting switch panel comprising a body formed with a plurality of separate enclosed flame tight switch compartments, said switch compartments being formed integral with the body and being arranged on each side thereof with the outer ends of the compartments adjacent the outer edges of the body, the body also being formed with an integral enclosed flame tight wire compartment extending lengthwise thereof and arranged between the inner ends of the switch compartments, and being common to all said switch compartments, the outer end of each switch compartment being provided with a detachable flame tight closure to permit installation of the switch in the compartment, and the top wall of the wire compartment being provided with a plurality of work openings and flame tight removable closures for said openings.

3. An enclosed explosion resisting switch panel comprising an integral body formed with a base, a plurality of separately enclosed flame tight switch compartments, and an enclosed flame tight wire compartment arranged adjacent to the switch compartments and extending along one side of said compartments, one wall of the wire compartment, and one wall of each switch compartment, being provided with a work opening, and a detachable flame tight closure for each of said openings.

4. An explosion resisting switch panel comprising an integral body formed with a base, a plurality of separate enclosed flame tight switch compartments, and an enclosed flame tight wire compartment, said wire compartment being arranged adjacent the inner wall of each switch compartment, the outer wall of each switch compartment being formed with an internally threaded opening to permit installation of the switch in the compartment, closures threading into each of said openings, one wall of the wire compartment being provided with threaded openings to permit access to said wire compartment, and closures threading into said openings.

5. An explosion resisting switch panel comprising an integral body formed with a base, a plurality of separate enclosed flame tight switch compartments, and an enclosed flame tight wire compartment, said wire compartment being arranged adjacent the inner wall of each switch compartment, the outer wall of each switch compartment being formed with an internally threaded opening to permit installation of the switch in the compartment, closures threading into each of said openings, one wall of the wire compartment being provided with threaded openings to permit access to said wire compartment, and closures threading into said openings, the switch compartments having means operable from the outside thereof to actuate the switch into on and off positions.

6. An enclosed explosion resisting switch panel comprising an integral body formed with a base, and a plurality of separate enclosed flame tight switch compartments, said compartments extending in a transverse direction relative to the base portion and arranged along each side of the base with the inner ends of the compartments in spaced apart relationship, said body also being formed with an integral enclosed flame tight wire compartment extending between the switch compartments, said wire compartment having a work opening in the top wall thereof, and a flame tight removable closure for said opening, the outer ends of the switch compartment being provided with an opening to permit installation of the switch, and a flame tight removable closure for said opening.

7. An enclosed explosion resisting switch panel comprising an integral body formed with an enclosed flame tight wire compartment arranged centrally of the body and extending lengthwise thereof, said body also being formed with a plurality of separate enclosed flame tight switch compartments extending transversely of the body and arranged on each side of said wire compartment, the outer ends of said switch compartment being provided with an opening to permit installation of the switch therein, and flame tight removable closures for each of said openings, one wall of the wire compartment being provided with openings, flame tight removable closures for said openings, and means carried by each switch compartment and operable from the outside thereof to actuate the switch into on and off positions.

8. An enclosed explosion resisting switch panel formed with an enclosed flame tight wire compartment arranged centrally of the body and extending lengthwise thereof, and being formed at one end with a transverse compartment, said body also being formed with a plurality of integral enclosed flame tight switch compartments, said compartments being arranged on each side of the wire compartment, the outer ends of said switch compartments being provided with an opening to permit installation of the switch in said compartments, a removable flame tight closure for each of said openings, the top wall of the switch compartment being provided with a plurality of openings and a removable flame tight closure for each of said openings, and means arranged in flame tight relationship with each switch compartment, and operable from the outside thereof for actuating the switch in the compartment.

9. An enclosed explosion resisting switch panel comprising an integral body formed with a base, a plurality of separately enclosed flame tight switch compartments with their outer ends adjacent one edge of the base, a flame tight wire compartment extending lengthwise of the base adjacent the opposite ends of the switch compartments, the top wall of the wire compartment and of each switch compartment being provided with work openings and detachable flame tight closures for each of said openings, the outer ends of the switch compartments being formed with an internally threaded opening to permit installation of the switch in the compartment, and a closure threading into each of said openings.

10. An explosion resisting switch panel comprising an integral body formed with a base, a plurality of flame tight switch compartments extending transversely of the base and arranged side by side along each side edge of the base, said body being also formed with a flame tight wire compartment extending lengthwise of the base between the inner ends of said switch compartments, said switch compartments being provided with internally threaded openings at their outer ends to permit insertion of the switch, the top wall of the wire compartment being provided with work openings and threaded closures for said openings in the switch compartments and the wire compartment.

11. An explosion resisting switch panel comprising an integral body formed with a base, a plurality of separately enclosed flame tight switch compartments arranged side by side on the base with their outer ends adjacent the outer edge of the base, said body being also formed with a flame tight wire compartment at the inner ends of the switch compartments and common to all of the switch compartments and separated therefrom by a flame tight partition, the outer ends of the switch compartments being provided with openings to permit installation of the switch, the top wall of the wire compartment being provided with work openings and detachable flame tight closures for said openings in the switch compartments and the wire compartment.

HAROLD P. HASTINGS.